(12) United States Patent
Goyal et al.

(10) Patent No.: US 8,898,765 B2
(45) Date of Patent: Nov. 25, 2014

(54) SIGNING OFF FROM MULTIPLE DOMAINS ACCESSIBLE USING SINGLE SIGN-ON

(75) Inventors: Sanyam Goyal, Bangalore (IN); Vikas Pooven Chathoth, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 102 days.

(21) Appl. No.: 13/396,616

(22) Filed: Feb. 15, 2012

(65) Prior Publication Data

US 2013/0212665 A1   Aug. 15, 2013

(51) Int. Cl.
H04L 29/06 (2006.01)

(52) U.S. Cl.
USPC .............................................................. 726/8

(58) Field of Classification Search
CPC .............................. H04L 63/0815; G06F 21/41
USPC .............................................................. 726/8
See application file for complete search history.

(56) References Cited

U.S. PATENT DOCUMENTS

| | | | |
|---|---|---|---|
| 5,774,551 A | 6/1998 | Wu et al. | |
| 7,636,941 B2 | 12/2009 | Blinn et al. | |
| 7,673,045 B1 * | 3/2010 | Battle et al. | 709/225 |
| 2002/0032731 A1 | 3/2002 | Qian et al. | |
| 2008/0184158 A1 * | 7/2008 | Selig | 715/781 |
| 2010/0071056 A1 * | 3/2010 | Cheng et al. | 726/16 |
| 2013/0198818 A1 * | 8/2013 | Hitchcock et al. | 726/5 |

FOREIGN PATENT DOCUMENTS

| | | |
|---|---|---|
| EP | 1426847 A3 | 5/2005 |
| WO | WO2002039237 A2 | 5/2002 |
| WO | WO2004059478 A2 | 7/2004 |

OTHER PUBLICATIONS

Single Sign Out—WebSSO , http://blogs.msdn.com/b/eugeniop/archive/2011/02/16/single-sign-out-websso.aspx , downloaded circa Aug. 17, 2011, pp. 1-3.
Single Sign on (SSO) for cross-domain ASP.NET applications: Part—I—the design blue print—, http://www.codeproject.com/KB/aspnet/CrossDomainSSOModel.aspx downloaded circa Aug. 17, 2011, pp. 1-20.

* cited by examiner

*Primary Examiner* — Jason Gee
(74) *Attorney, Agent, or Firm* — Narendra Reddy Thappeta

(57) ABSTRACT

An aspect of the present invention simplifies signing-off from multiple domains. In an embodiment, upon receiving a sign-off request from a user signed-on to multiple domains, the user is signed-off from at least two, but not all, the signed-on domains in due course. According to another aspect, the domains of an enterprise are organized as groups of domains. In response to receiving a request for signing-off from a first domain, the user is signed-off from each of a group of domains corresponding to the first domain (in addition to the first domain). In an embodiment, an administrator of the enterprise specifies a master domain for each group, to facilitate identification of the group to be signed-off. According to another aspect, a user selects a set of domains to sign-off from. The user is signed-off from only the selected set of domains.

17 Claims, 6 Drawing Sheets

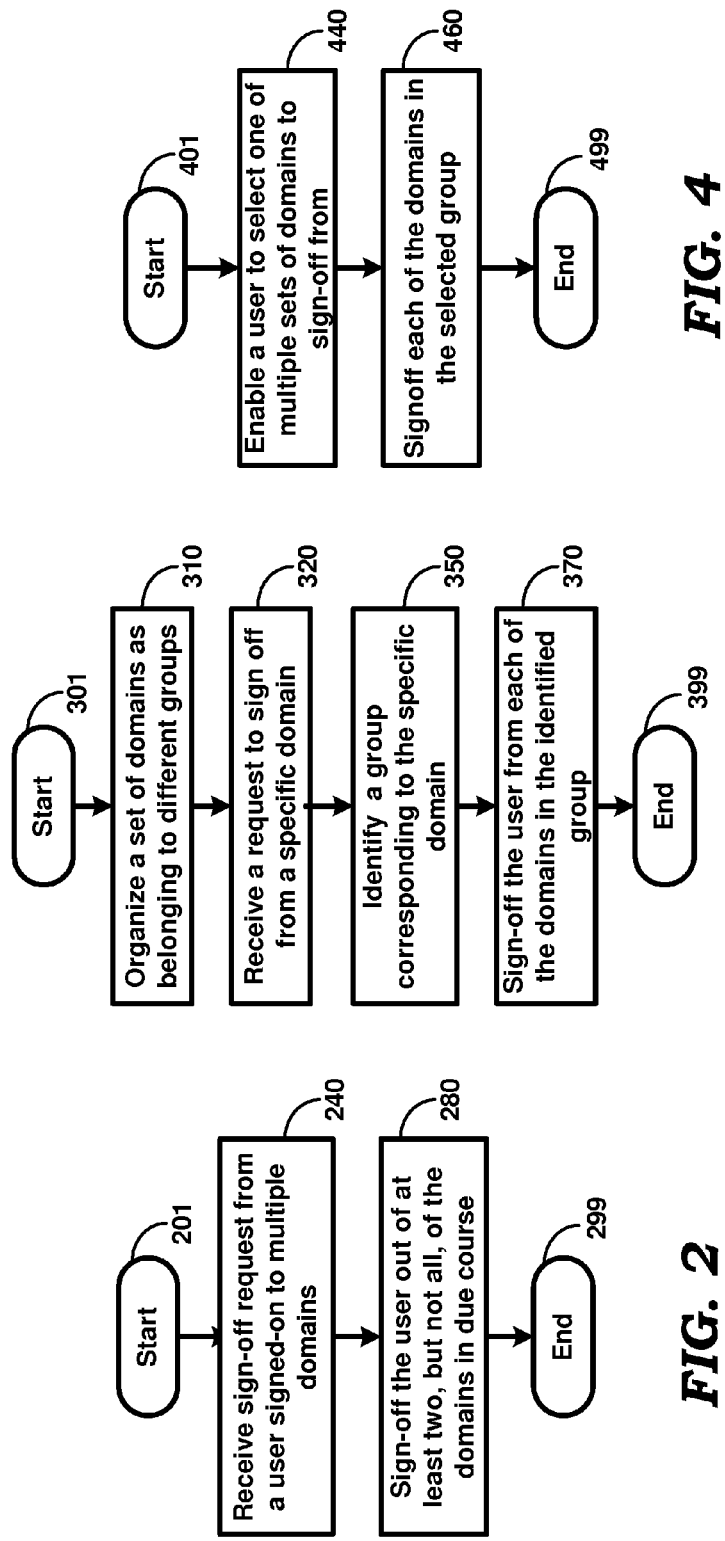

```
<Setting Name="PartnerLogoutUrls" Type="htf:map">
  <Setting Name="Server1" > gmail.com </Setting>
  <Setting Name="Server2" > youtube.com </Setting>
  <Setting Name="Server3" > picasa.com </Setting>
  <Setting Name="Server4" > googleplus.com </Setting>
  <Setting Name="Server5" > orkut.com </Setting>
</Setting>
```
← 510, → 520

FIG. 5A

```
<Setting Name="PartnerLogoutUrls" Type="htf:map">
  <Setting Name="MasterServer" >
    <Setting Name="name">gmail.com</Setting>                  ┐
    <Setting Name="Server1" > orkut.com </Setting>            │ 545
    <Setting Name="Server2" > youtube.com </Setting>          ┘
  </Setting>                                                          ← 540
  <Setting Name="MasterServer" >
    <Setting Name="name">youtube.com</Setting>                ┐
    <Setting Name="Server1" > orkut.com </Setting>            │ 555
    <Setting Name="Server2" > youtube.com </Setting>          ┘
  </Setting>                                                          ← 550
  <Setting Name="MasterServer" >
    <Setting Name="name">googleplus.com</Setting>             ┐
    <Setting Name="Server1" > gmail.com </Setting>            │
    <Setting Name="Server2" > youtube.com </Setting>          │ 565
    <Setting Name="Server3" >picasa.com </Setting>            ┘
  </Setting>                                                          ← 560
```

FIG. 5B

SIGNING OFF FROM MULTIPLE DOMAINS ACCESSIBLE USING SINGLE SIGN-ON

BACKGROUND

1. Technical Field

The present disclosure relates to web technologies and more specifically to signing off from multiple domains signed-on using approaches such as single sign-on (SSO).

2. Related Art

A domain contains resources (web pages, files, applications, services, etc.), which are accessible at a corresponding unique domain name. Examples of domains include ibm.com, oracle.com, microsoft.com, etc. Such domains ("parent domains") often contain lower level domains, which are referred to as sub-domains. For example, yahoo.com is referred to as a parent domain for the sub-domains finance.yahoo.com, sports.yahoo.com (or www.yahoo.com/sports), etc. The parent domains and sub-domains are collectively referred to as domains.

In general, each domain exercises at least some level of administrative autonomy (as to who can access resources and under what conditions) to require password type authentication before providing access to at least the protected resources (contrasted with public resources, which do not require authentication for access). Each reference to resource hereafter refers to protected resources unless expressly stated otherwise. Though multiple domains can be implemented using same server systems in theory, often different domains are implemented using corresponding disparate server systems for reasons such as administrative convenience and performance.

Single sign-on (SSO) facility is often provided across multiple domains, typically for the convenience of users. SSO refers to an authentication feature where a single authentication permits the same user from the same/single client/user system, to thereafter access resources in multiple domains. Without the single sign-on feature, the user may be required to provide the authentication information repeatedly for each of the domains, before access to corresponding resources is provided.

Users are generally required to sign off from domains generally when resources are no longer required to be accessed. Signing off (also referred to as logging out) of a domain accordingly implies that the user is no longer able to access resources without a subsequent authentication. Several aspects of the present invention enable convenient signing off from multiple domains signed-on using approaches such as SSO.

BRIEF DESCRIPTION OF THE DRAWINGS

Example embodiments of the present invention are described with reference to the accompanying drawings briefly described below.

FIG. 2 is a flow chart illustrating the manner in which a user is facilitated to sign-off from multiple domains according to an aspect of the present invention.

FIG. 3 is a flow chart illustrating the manner in which an enterprise controls signing-off from multiple domains according to an aspect of the present invention.

FIG. 4 is a flow chart illustrating the manner in which a user can control the signing-off from various domains according to an aspect of the present invention.

FIG. 5A depicts a list of domains supporting SSO feature in one embodiment.

FIG. 5B depicts the organization of the domains as different groups in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention simplifies signing-off from multiple domains. In an embodiment, upon receiving a sign-off request from a user signed-on to multiple domains, the user is signed-off from at least two, but not all, the signed-on domains in due course.

According to another aspect, the domains of an enterprise are organized as groups of domains. In response to receiving a request for signing-off from a first domain, the user is signed-off from each of a group of domains corresponding to the first domain (in addition to the first domain). In an embodiment, an administrator of the enterprise specifies a master domain for each group. The identification of the group to be signed-off is determined by comparing the identifier of the first domain with the respective identifiers of the master domains.

According to another aspect, a user selects a set of domains to sign-off from. The user is signed-off from only the selected set of domains.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
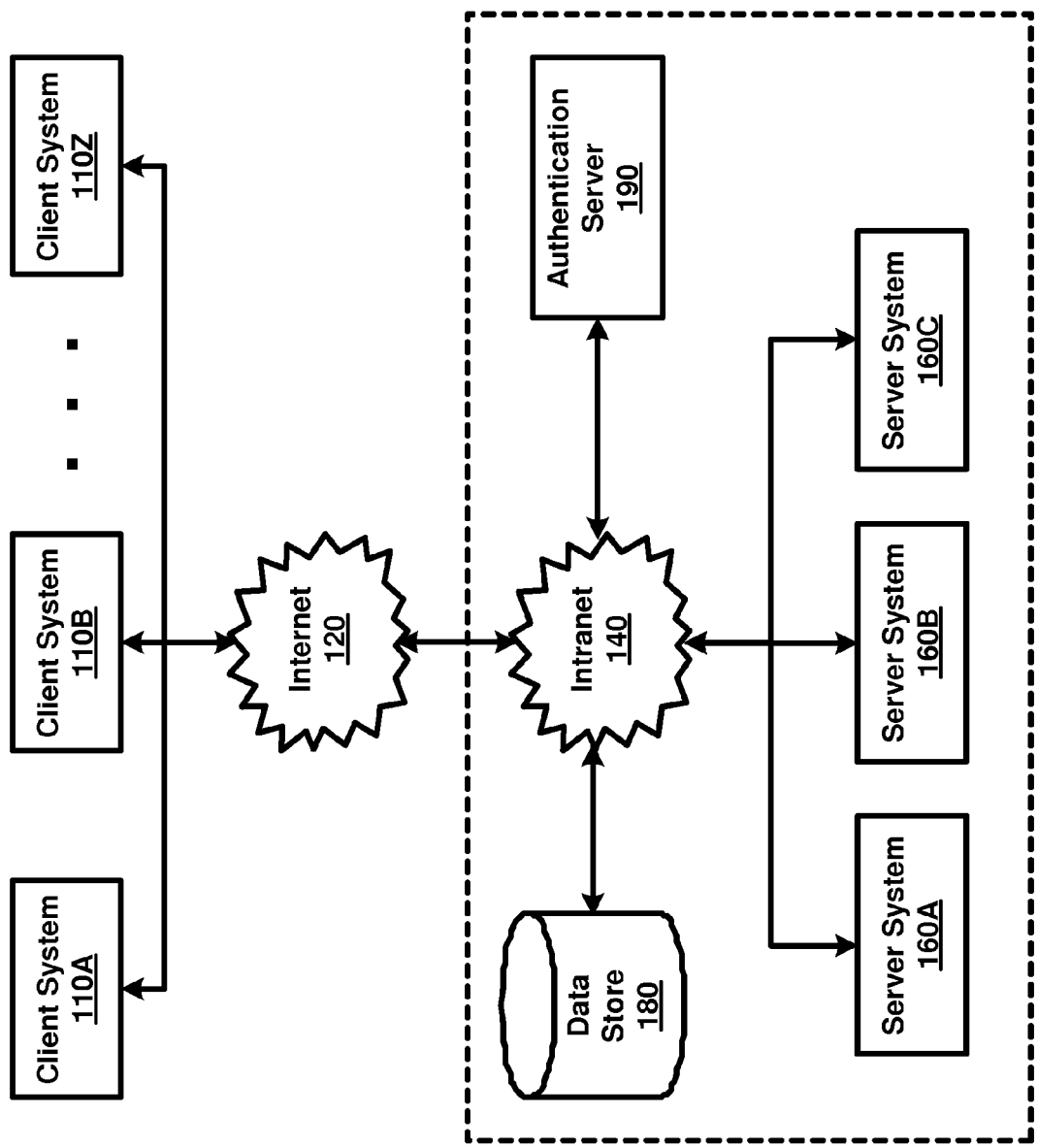
FIG. 1 is a block diagram illustrating an example environment (computing system) which can be extended using several aspects of the present invention.

FIG. 1 is a block diagram illustrating an example environment (computing system) which can be extended using several aspects of the present invention. The block diagram shows client systems 110A-110Z, Internet 120, intranet 140, server systems 160A-160C, data store 180 and authentication server 190.

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between server systems 160A-160C, data store 180, and authentication server 190, all provided within an enterprise or domain (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Data store 180 represents a non-volatile (persistent) storage facilitating storage and retrieval of a collection of data by applications executing in server systems 160A-160C (and also authentication server 190). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, etc., used to access various resources (such as data and/or applications) provided within or external to the computing system of FIG. 1. The resources may be accessed based on HTTP requests generated by client applications, such as a browser, executing in the client system (in response to a user interaction). In response to sending the requests, the client system receives the corresponding web pages (or other suitable responses), as implemented in the corresponding environment. The web pages/responses may then be presented to the user by the client applications such as the browser.

Each of server systems 160A-160C represents a server, such as a web/application server, capable of hosting resources and thereafter providing access to the hosted resources in processing corresponding requests received from client systems 110A-110Z. For simplicity it is assumed that each server system maintains resources of a single domain, though domains are often implemented using multiple server systems (with load balancing, fail-over mechanism, etc.), as noted above. Accordingly, each server (or resources thereon) may be accessible using a Uniform Resource Locator (URL) containing a corresponding unique domain name. It is assumed that at least some of the resources on each server are protected resources such that proper (e.g., password) authentication is required, before a user (from one of client systems 110A-110Z) can access the corresponding resources.

Authentication server 190 represents a system such as a server, which authenticates users attempting to access resources hosted on server systems 160A-160C. Once a user is authenticated, the user may access the resources, for example, using HTTP based web pages. Authentication server 190 may accordingly maintain the user information (e.g., user identifier-password combinations) required to authenticate each user, in addition to any information related to the server systems permitted to use such authentication feature. Such details may be stored on and retrieved from data store 180.

Thus, the systems within the "enterprise" of FIG. 1 operate together to enable users to access (and use) desired protected resources after successful authentication. The server systems 160A-160C and authentication server 190 may be implemented to support single sign-On feature, to simplify the authentication process for the users. Thus, a user provides authentication information when signing on to one of the domains/server systems, and the user is provided access to resources in other domains also based on the single sign-on feature.

An aspect of the present invention provides a flexible approach in signing-off from multiple domains also, as described below with example.

3. Signing-Off from Multiple Domains

FIG. 2 is a flow chart illustrating the manner in which a user is facilitated to sign-off from multiple domains according to an aspect of the present invention. The flowchart is described with respect to FIG. 1, and in particular with respect to authentication server 190, merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 240.

In step 240, authentication server 190 receives a sign-off request from a user signed into multiple domains, for example, using SSO. The sign-off request may be received from a client system, in response to a user having requested such sign-off. The sign-off request may be first received by one of server systems 160A-160C, and then forwarded to authentication server 190.

In step 280, authentication server 190 signs-off the user out of at least two, but not all, of the domains in due course. The term 'due course' excludes what are considered error or failure conditions. In other words, in the absence of such error or failure conditions, authentication server 190 continues to keep the user signed-on in at least one of the signed-on domains, while signing-off from at least two domains.

As a result, after operation of step 280, the user can continue to access resources on the signed-on domain(s), while access is denied to resources on the domains signed-off in response to the sign-off request. The flow chart ends in step 299.

Such a feature provides enhanced flexibility to users in signing-off from multiple domains. The features can be implemented by any appropriate interfaces defined between the various systems of FIG. 1, as illustrated below with examples.

4. Enterprise Controlled Signing-Off

FIG. 3 is a flow chart illustrating the manner in which an enterprise controls signing-off from multiple domains according to an aspect of the present invention. The flowchart is described with respect to FIG. 1, and in particular with respect to authentication server 190, merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, a set of domains of the enterprise is organized as belonging to different groups. Such organization may be based on any convention as suited for the corresponding environment. In one example environment, FIG. 5A depicts a list of domains supporting SSO feature. In other words, if a user successfully signs-on to one of the domains (e.g., gmail.com of line 510), the user is thereafter deemed to have signed-on to (and accordingly have access to resources hosted on) all other domains of the list (520) of FIG. 5A.

In such an environment, FIG. 5B depicts the organization of the domains as different groups. Thus, data portions 540/550/560 respectively contain the domains in the corresponding groups. Each group contains a master server (545, 555 and 565), which when signed-off of, requires signing-off from the remaining domains in the corresponding group. For example, by operation of data portion 560, if a sign-off request is received for domain 'googleplus.com', the user is to be signed-off from gmail.com, youtube.com, and picasa.com, in addition to googleplus.com.

The configuration data of FIGS. 5A and 5B may be stored in data store 180, with authentication server 190 being designed to operate based on the stored data, as described below.

In step 320, authentication server 190 receives a request to sign-off from a specific domain. The request may be received similar to that described above with respect to step 240, with the request in addition indicating the specific domain to sign-off from. Typically, the packets related to a user session are received by a corresponding domain/server system (with which the user is then interacting), and a sign-off request from the user may be deemed to be a sign-off request for the corresponding domain. Accordingly, the corresponding server system may send the sign-off request, along with the domain name, to authentication server 190. For illustration, it is assumed that the request is for signing-off from googleplus.com domain.

In step 350, authentication server 190 identifies a group corresponding to the specific domain from which the sign-off is to be performed. Authentication server 190 may examine the configuration data of FIG. 5B and determine the corresponding group of domains from which to sign-off as well. Thus, in the case of googleplus.com domain being received in request of step 320, the group corresponding to data portion 560 is identified.

In step 370, authentication server 190 signs-off the user from each of the domains in the identified group. Signing-off generally entails making ineffective the actions performed for signing-on to the respective domains. As a result, the user is thereafter unable to access the resources of such signed-off domains (googleplus.com, gmail.com, youtube.com, and picasa.com, in the illustrative example), without subsequent authentication. The flow chart ends in step 399.

Thus, enterprises can control the specific set of domains from which a user is automatically (i.e., without having to issue individual sign-off requests) signed-off in response to a single sign-off request for a specific domain. However, there can be several scenarios in which a user may wish to have such control of all the domains signed-off with a single request. An example approach for meeting such a requirement is described below with examples.

5. User Controlled Signing-Off

FIG. 4 is a flow chart illustrating the manner in which a user can control the signing-off from various domains according to an aspect of the present invention. The flowchart is described with respect to FIG. 1, and in particular with respect to client system 110A and authentication server 190, merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 401, in which control immediately passes to step 440.

In step 440, a user is enabled to select desired set of domains to sign-off from. For example, authentication server 190 or one of the server systems may send a corresponding web page which provides a suitable interface for a user to select the desired domains. Alternatively, a software application executing on client system 110A may provide a similar user interface. Information on the selected set may be passed to authentication server 190, as a corresponding (single) request, upon a suitable user action.

In step 460, authentication server 190 signs-off the user from each of the selected domains. The step may be performed as described above with respect to step 370. The flow chart ends in step 499.

Thus, the user is provided the ability to control the specific domains to sign-off from, based on a single request sent to the enterprise. The description is continued with respect to an example user interface for step 440 described above.

Figure 6:
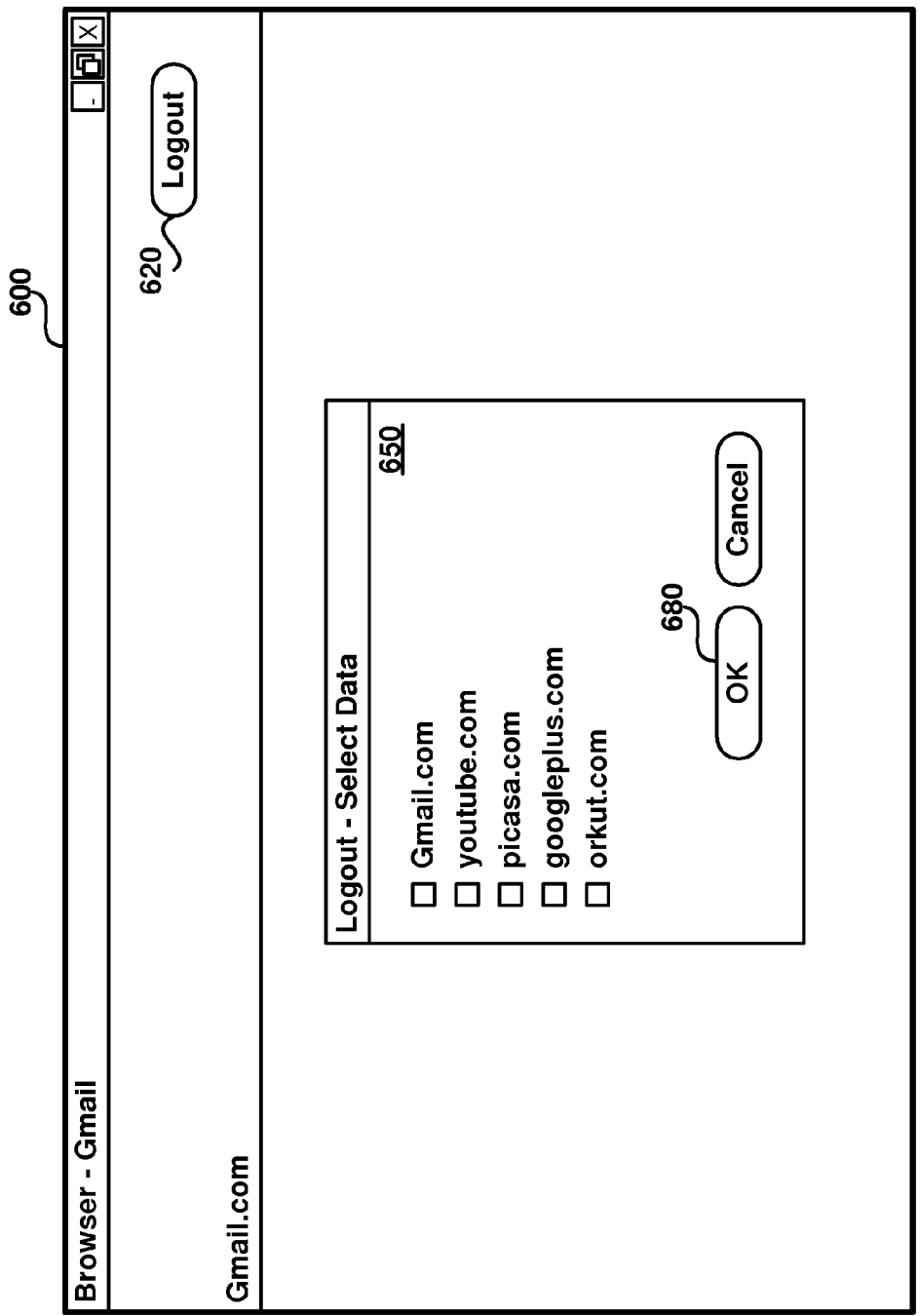
FIG. 6 depicts a user interface provided at a client system for facilitating a user to control signing-off from multiple domains in one embodiment.

FIG. 6 depicts a user interface provided at client system 110A in one embodiment. Web page 600 (displayed on a display screen of client system 110A) is shown (at 610) to have been received from domain gmail.com (with which the user is then interacting). Upon a user clicking on logout button 620, the pop-up window 650 is displayed. Once the user selects the desired domains (using the check-boxes shown associated with respective domains) and clicks on OK button 680, the resulting request (containing gmail.com and picasa.com, shown selected) is sent to the server system corresponding to gmail.com domain, which then forwards the request to authentication server 190.

It may be observed that the list of domains displayed in window 650 corresponds to the configuration data of FIG. 5A, although in alternative embodiments authentication server 190 can cause display of only the specific domains the user is currently signed-on to. Such domains may be determined using SSO related information maintained by authentication server 190. Furthermore, the specific combination/group of domains specified by the user is not among the groups specified by the enterprise in FIG. 5B.

The features described above with respect to FIGS. 2-6 can be implemented in various environments using approaches suited for the corresponding environments. In one embodiment, such features are implemented in a environment implementing sign-on using SSO. The details of a corresponding example implementation are described below.

6. Example Implementation Using SSO

Figure 7:
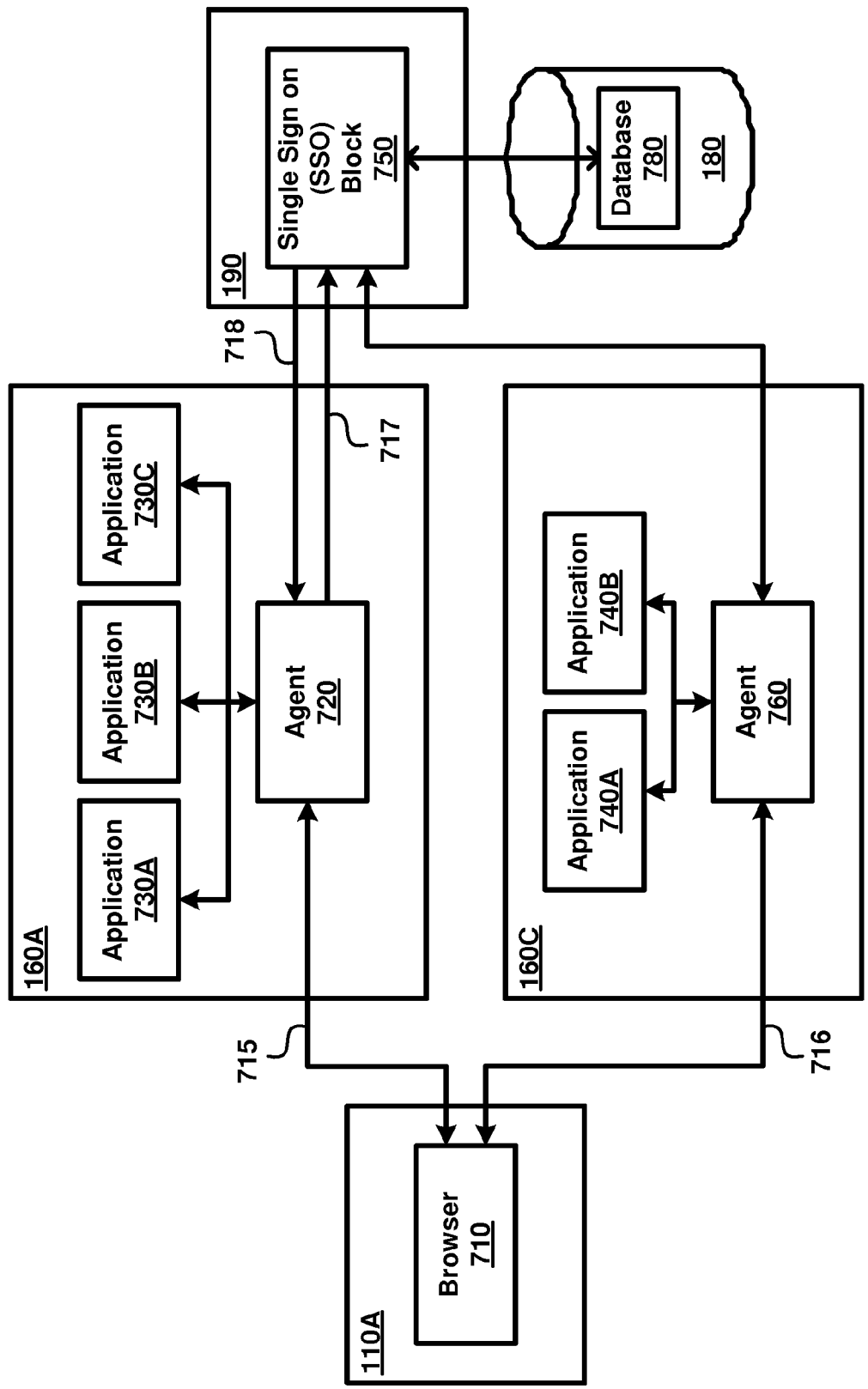
FIG. 7 is a block diagram illustrating the manner in which signing off from multiple domains signed-on using single sign-on (SSO) is implemented in one embodiment.

FIG. 7 is a block diagram illustrating the manner in which signing off from multiple domains signed-on using single sign-on (SSO) is implemented in one embodiment. The block diagram shows browser 710, agents 720 and 760, application blocks 730A-730C and 740A-740B, SSO block 750 and database 780. Each of the blocks is described in detail below.

Browser 710, executing in client system 110A, represents an application, which when executed on a digital processing system, enables users to access various content (such as audio, video, text, data, etc.) over Internet 120 using standard protocols such as HTTP, as is well known in the relevant arts. The content is generally received from server systems (such as web servers) accessible via the Internet in the form of respective web pages, and presented (played, displayed, etc.) to users. Examples of browsers include Internet Explorer™, Firefox™, and Chrome™ applications.

In response to requests identifying (by a URL) the desired web pages, each server system is designed to form and send the requested web pages to the requesting client system. The web pages may be either be static web pages that are retrieved from an internal or external (such as data store 180) storage or may be formed/created dynamically, where the content for the web pages are generated (e.g., by interfacing with applications executing in application servers) in response to the request, as is well known in the relevant arts.

Server systems 160A and 160C are accordingly shown providing a corresponding set of user applications operating based on web pages. Each of the application blocks 730A-730C and 740A-740B implements a corresponding user application. The user applications provide disparate user functions such as allowing users to search for web pages, send and/or receive email, manage and upload/download photos, interact with others organized as social networks, etc. In general, each application block contains the program logic to operate in conjunction with the corresponding agent (720/760) and provide various application features to the user and may be implemented in a known way.

The different user applications may be made accessible as part of a single or multiple domains. In the following description, it is assumed that the different applications (and the corresponding functionality) executing in server systems 160A/160C are provided as individual sub-domains (e.g. mail.google.com) of the same parent domain (assumed to be google.com).

It is further assumed that all of application blocks 730A-730C and 740A-740B are protected resources that require authentication prior to access. While the description herein is provided with respect to treating only applications as protected resources, several features of the present invention can be implemented in conjunction with other types of resources (e.g., specific parts of an application or specific data such as images forming part of static web pages), the access to which is controlled by server system 160A-160C (similar to control of access to applications).

Thus, when a user attempts to access any of the application blocks for the first time or upon trying to expressly logon (e.g., by clicking on a hyperlink intended for logging on) as indicated by request 715, a web page is provided for receiving authentication information (e.g., user identifier and password). After the user is authenticated based on the provided information, browser 710 receives and stores locally a (user) cookie, as an indication of successful authentication of the user. As is well known, cookies represent information stored at client/user systems (110A-110Z) by browsers for purposes such as maintaining user information, session information, etc. The reader is referred to RFC 2109 entitled, "HTTP State Management Mechanism", for further information on cookies.

In general, browser 710 is designed to maintain cookies corresponding to various domains accessed by the user, and to include the corresponding cookie in the header of requests sent to the systems in the same domain. For example, browser 710 may include the cookie stored after successful authentication in the header of request 716 sent to server systems 160C, since server systems 160A and 160C belong to the same domain. Browser 710 may determine the systems belonging to the same domain based on the URLs (for example, if the URLs contain the "google.com" text in the above noted example) of the web pages sought to be accessed on the different server systems.

Each of agents 720 and 760 receives requests for various web pages (identified by URLs) from browser 710 and serves/sends the requested web pages as corresponding responses. Prior to permitting access to the applications blocks, agents 720/760 may ensure that the user is authenticated (to access the specific resource being accessed). In general, protected resources may be indicated by appropriate configurations and the agents may examine the configuration data to determine whether a resource is protected or not.

In the scenario that a request for web page (of a user application) is received from an unauthenticated user, agents 720/760 redirect the request to authentication server 190. Redirection refers to having some other system (here authentication server 190) respond to a web page request, when the request is directed to a system (here, server systems 160A/160C). The absence of authentication for a protected resource may be determined based on absence of cookie information with the request or invalid cookie (e.g., expired cookie, cookie content does not cover the resource sought to be accessed or incorrect cookie data otherwise).

Authentication server 190 authenticates each user based on authentication information received from the users. In an embodiment, SSO block 750 receives redirects from agent 720/760 (e.g., on path 717) when web page requests are received from unauthenticated users, and sends a web page (also specified in the redirected message) for a user at browser 710 to be able to enter authentication information such as a user identifier and password combination. The received combination is compared with the combinations in database 780 to authenticate the user. The information in the database may further indicate various user attributes (e.g., complete user name, user specific configurations, etc.), which are also retrieved and sent along with confirmation of successful authentication to agent 720/760 (e.g. on path 718).

In an embodiment, the authentication confirmation message is received in the form of a string, containing the URL of the requested resource and parameters including authentication result, and the user name, in encrypted form. Other information such as time stamp, lifetime of the authentication (validity duration), the resources/domains the authentication is valid for, etc., may also be included in the message.

Thus, upon successful authentication by SSO block 750, agent 720/760 receives the confirmation message and then forms a user cookie, which is encrypted form of information received from authentication server 190. In addition, the user cookie may include (in encrypted form) the IP address of the client system for which the cookie is intended, the expiration date of the cookie, time stamp representing the current time at which the cookie is created, any session identifier, authentication level (identifying the class/set of resources the user is permitted to access), etc. The user cookie containing the encrypted information is then sent to browser 710.

It may be appreciated that the decryption of the cookie may require a corresponding decryption key, and accordingly each of agents 720 and 760 may be designed to operate with a common decryption key. In one embodiment, a common encryption/decryption key combination for encryption/decryption of the cookie information is generated for the domain and distributed to the various server systems (providing access to user applications/protected resources). The distribution of the common keys may be performed by authentication server 190.

Web page requests (such as 716) from the same browser (710) to access same or different applications are thereafter received along with the user cookie sent earlier. If the cookie is successfully decrypted, the request is deemed to be from an authenticated user. Accordingly, agents 720 and 760 operate in conjunction with the corresponding application (determined usually based on the URL in the received request) to generate the next web page. Some of the content in the decrypted cookie may potentially be provided to the application blocks for further use.

In a scenario, that application blocks executing in server systems 160A and 160C are respectively are associated with different parent domains such as gmail.com and googleplus.com (instead of sub-domains of the same domain), browser 710 may be designed to accept third-party cookies and accordingly on successful authentication of one parent domain, cookies for the related parent domains (for which SSO is sought to be provided) may also be created by agents 720/760 and forwarded (for storage) to browser 710. Browser 710, thereafter, includes the respective cookies in the web requests sent to the other domains (e.g., server system 160C), and is accordingly provided access to the resources on the other parent domains.

Thus, the server systems 160A-160C and authentication server 190 operate together to provide access to users applications (resources) in the same/different domains, thereby providing the Single-Sign-On feature to access resources based on single authentication (and user cookies). The manner in which the implementation of FIG. 7 may be extended to support signing-off from multiple domains is described below with examples. The description is continued assuming that SSO block 750 is implemented to provide several aspects of the present invention.

7. Implementing Signing-Off from Multiple Domains

In response to receiving a sign-off request from a user (and forwarded from one of agents 720/760), SSO block 750 may generate a new authentication confirmation message indicating a different set of resources/domains that are accessible by the user and forward the new confirmation message to the agents on the server systems. The agent(s) may further create a new cookie according to the new confirmation message, and forward (for overwriting the old cookie, if any) the new cookie to browser 710. Subsequent web page requests for resources/domains (not specified in the cookie) may accordingly fail, and require the user to provide authentication information again.

In the scenario of multiple parent domains, the specific third-party cookies corresponding to the parent domains sought to be signed-off are deleted in browser 710, thereby ensuring that users are not allowed any subsequent accesses to the resources in the deleted domains. The specific third-party cookies to be deleted may be determined by SSO block 750 based on the configuration data of FIG. 5B or based on the user specified domains using the interface of FIG. 6.

For example, in response to a sign-off request received for domain 'googleplus.com' (and by operation of steps 350 and 370), the third-party cookies corresponding to the domains gmail.com, youtube.com, and picasa.com are deleted, in addition to the cookies for googleplus.com. Such deletion may be performed by any one of agents in the domains, for example, agent 760 (googleplus.com) to which the sign-off request is initially sent.

Similarly, with respect to FIG. 4, SSO block 750 may inspect the configuration data of FIG. 5A and provide a web page to display all the domains in display area 650 of FIG. 6. Alternatively, SSO block 750 may examine active session information (i.e., the specific domains actually accessed) and cause display of only such active sessions in display area 650. Though data portion 520 of FIG. 5A contains 5 domains, display area 650 may display only 3 of the domains, assuming that such 3 domains have been accessed by the user during the session. Upon receiving a sign-off request with the specific domains to be signed-off, SSO block 750 deletes only the third party cookies corresponding to the specific domains.

There are several scenarios in which restrictions are imposed on cookies maintained on the client systems. For example, the browser may be designed to or the user may indicate to the browser (even when having the capability) that third-party cookies are not allowed to be created and/or accessed. In other words, an agent of a domain (server system) is provided access to (and can accordingly delete) only the cookie for the domain. It may be accordingly desirable that deletion of the cookies be done by the corresponding agents (of the different domains) as described in detail below.

Thus, in one embodiment, a logout module is deployed in the server systems (such as 160A-160C) associated with the domains (accessible using SSO) and is made publicly accessible on a corresponding URL. The URLs of the different logout modules and the associated domains are maintained as part of configuration data by SSO block 750. In response to a sign-off request, SSO block 750 determines the specific domains to be signed-off from and a list of corresponding logout modules (along with URLs). SSO block 750 then send a logout request to the first logout module in the list.

Each logout module is designed to receive a logout request from either SSO block 750 or another logout module (previously in the list), delete the cookies corresponding to the associated domain, and then forward the logout request to the next logout module (using the corresponding URL) in the list. The forwarding of the logout request may be performed by redirecting browser 710 to the URL corresponding to the next module.

Each logout module may also be designed to first check whether the next logout module is alive (by using communication protocols such as ping, telnet) and then forward the logout request only when the next module is active. If the next logout module is not alive, the module may be designed to wait for a pre-configured period of time before (checking and) forwarding the logout request. The last logout module may merely delete the corresponding cookies.

Each of the logout modules may be further designed to send an acknowledgment to SSO block 750 indicating successful sign-off from the corresponding domain (based on successful deletion of the cookies corresponding to the domain in the client system). SSO block 750 may accordingly keep track of the acknowledgments received from the different modules and indicate a successful sign-off only when acknowledgments from all the modules in the originally determined list have been received.

It should be further appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

Figure 8:
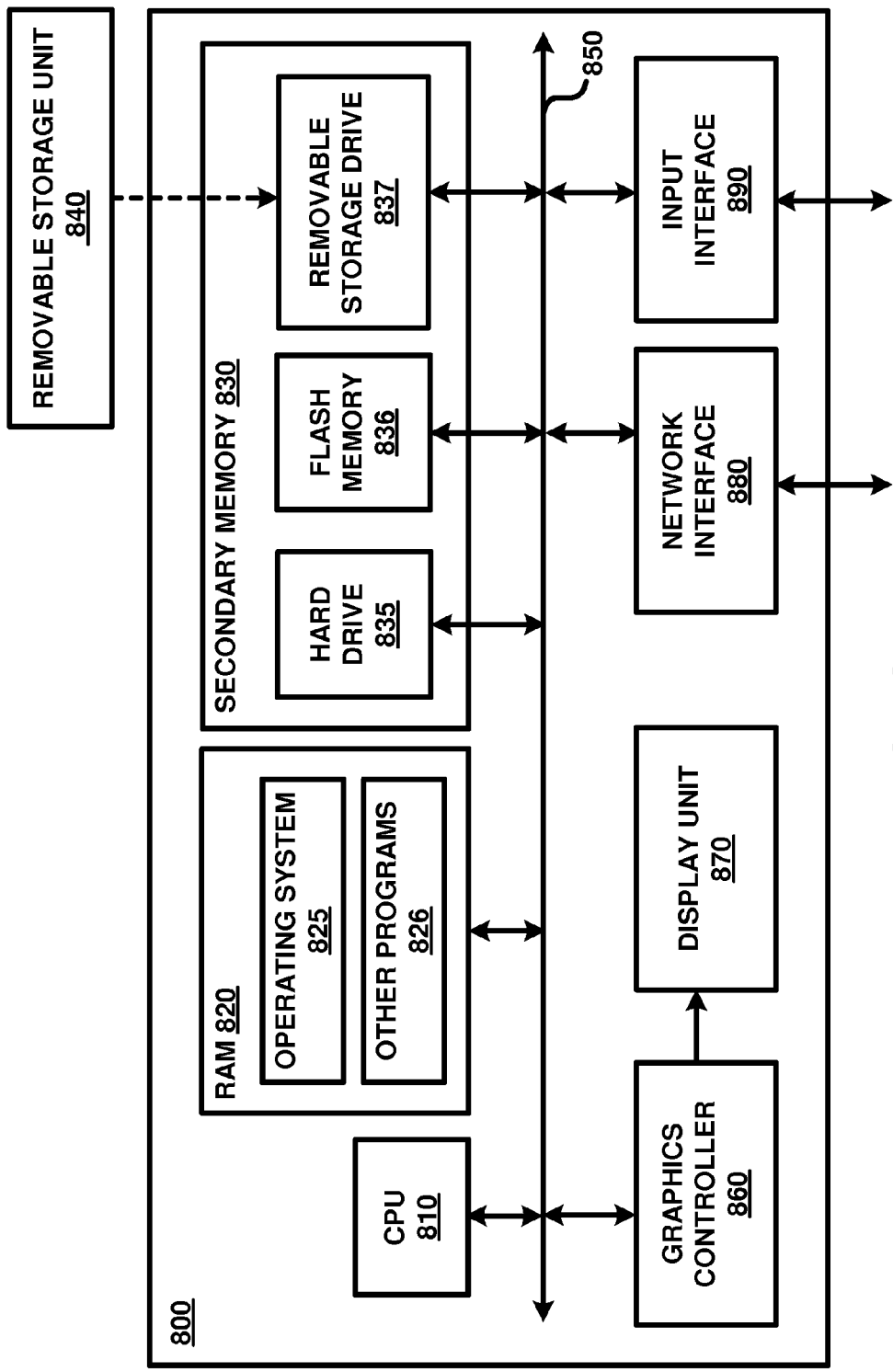
FIG. 8 is a block diagram illustrating the details of a digital processing system in which several aspects of the present invention are operative by execution of appropriate executable modules.

FIG. 8 is a block diagram illustrating the details of digital processing system 800 in which several aspects of the present invention are operative by execution of appropriate software instructions. Digital processing system 800 corresponds to authentication server 190, any system executing SSO block 750, or any other system providing the features of FIGS. 2-4 described above.

Digital processing system 800 may contain one or more processors (such as a central processing unit (CPU) 810), random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826 (such as networking applications, database applications, etc.). Shared environment 825 contains utilities shared by user programs, and such shared utilities include operating system, device drivers, virtual machines, flow engine, etc., which provide a (common) run time environment for execution of user programs/applications.

Graphics controller 860 generates display signals (e.g., in RGB format) to display unit 870 based on data/instructions received from CPU 810. Display unit 870 contains a display screen to display the images defined by the display signals (such as portions of the user interface shown in FIG. 6). Input interface 890 may correspond to a keyboard and a pointing device (e.g., touch-pad, mouse) that may be used to provide various inputs (such as those required for the user interface shown in FIG. 6). Network interface 880 provides connectivity to a network (e.g., using Internet Protocol), and may be used to communicate with other connected systems (such as server systems 160A-160C or client systems 110A-110Z).

Secondary memory 830 may contain hard drive 835, flash memory 836, and removable storage drive 837. Secondary memory 830 represents a non-transitory medium, which may store the data (for example, portions of configuration data of FIGS. 5A and 5B) and software instructions (for example, for performing the steps of FIGS. 2, 3 and, 4), to enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of signing-off a user from multiple domains, said method comprising:

receiving a sign-off request from said user at a first time instance, wherein said user is signed-on to a plurality of domains when said sign-off request is received at said first time instance, wherein said user is signed-on to said plurality of domains by virtue of a single sign on (SSO), said plurality of domains comprising at least three domains including a first domain and a second domain such that said user is enabled to access resources in both of said first domain and said second domain prior to said first time instance;

signing-off said user out of at least two, but not all, of said plurality of domains in due course by a second time instance upon completion of processing of said sign-off request, wherein said user is signed-off of said first domain but not signed-off of said second domain by said second time instance; and continuing to permit said user to access resources of said second domain, but not of said first domain, after said second time instance.

2. The method of claim 1, wherein said plurality of domains are organized as a plurality of groups, with each group containing a corresponding set of domains, wherein said sign-off request specifies a third domain to sign-off from, said method further comprising:

identifying a first group of said plurality of groups, corresponding to said third domain, said first group including said first domain, wherein said signing-off signs-off said user from each of the corresponding set of domains in said first group, including said first domain and said third domain, wherein said signing-off does not sign-off of the corresponding set of domains in a second group of said plurality of groups, wherein said second group includes said second domain, wherein said user is permitted continued access to resources of the corresponding set of domains in said second group after said second time instance.

3. The method of claim 2, wherein each of said plurality of groups specifies a master domain and an associated list of domains, wherein said identifying identifies said first group as corresponding to said third domain if the master domain of said first group matches said first domain.

4. The method of claim 3, wherein said master domain and said associated list of domains are specified by an administrator of an enterprise administering said plurality of domains, whereby said administrator control the specific list of domains said user is signed-off from when signing-off of a corresponding domain.

5. The method of claim 1, further comprising:

enabling a user to select a second set of domains of said plurality of domains, to sign-off from, wherein said sign-off request indicates said second set of domains, wherein said signing-off signs-off said user from each of said second set of domains.

6. The method of claim 5, wherein said enabling comprises sending for display said plurality of domains on a client system as a part of a web page, wherein said web page, when displayed on said client system, facilitates said user to select each of said second set of domains.

7. The method of claim 1, wherein said SSO is implemented by storing on a client system, a plurality of cookies, with each cookie corresponding to one of said plurality of domains, wherein said signing-off said user comprises deleting from said client system, cookies corresponding to said at least two, but not all, of said plurality of domains.

8. A non-transitory machine readable medium storing one or more sequences of instructions for causing a system to sign-off a user from multiple domains, wherein execution of said one or more sequences of instructions by one or more processors contained in said system causes said system to perform the actions of:

receiving a sign-off request from said user at a first time instance, wherein said user is signed-on to a plurality of domains at said first time instance such that said user is enabled to access resources in each of said plurality of domains prior to said first time instance, wherein said plurality of domains comprises at least three domains, wherein said user is signed-on to said plurality of domains using single sign on (SSO); and signing-off said user out of at least two, but not all, of said plurality of domains in due course by a second time instance upon completion of processing of said sign-off request, wherein said user is permitted to access resources of domains not signed off after said second time instance.

9. The non-transitory machine readable medium of claim 8, wherein said plurality of domains are organized as a plurality of groups, with each group containing a corresponding set of domains, wherein said sign-off request specifies a first domain to sign-off from, wherein said actions further comprise:

identifying a first group of said plurality of groups, corresponding to said first domain, wherein said signing-off signs-off said user from each of the corresponding set of domains in said first group including said first domain, wherein said signing-off does not sign-off of the corresponding set of domains in a second group of said plurality of groups, wherein said user is permitted continued access to resources of the corresponding set of domains in said second group after said second time instance.

10. The non-transitory machine readable medium of claim 9, wherein each of said plurality of groups specifies a master domain and an associated list of domains, wherein said identifying identifies said first group as corresponding to said first domain if the master domain of said first group matches said first domain.

11. The non-transitory machine readable medium of claim 10, wherein said master domain and said associated list of domains are specified by an administrator of an enterprise administering said plurality of domains, whereby said administrator control the specific list of domains said user is signed-off from when signing-off of a corresponding domain.

12. The non-transitory machine readable medium of claim 8, wherein said actions further comprise:

enabling a user to select a second set of domains of said plurality of domains, to sign-off from, wherein said sign-off request indicates said second set of domains, wherein said signing-off signs-off said user from each of said second set of domains.

13. The non-transitory machine readable medium of claim 12, wherein said enabling comprises sending for display said plurality of domains on a client system as a part of a web page,
wherein said web page, when displayed on said client system, facilitates said user to select each of said second set of domains.

14. The non-transitory machine readable medium of claim 8, wherein said SSO is implemented by storing on a client system, a plurality of cookies, with each cookie corresponding to one of said plurality of domains,
wherein said signing-off said user comprises deleting from said client system, cookies corresponding to said at least two, but not all, of said plurality of domains.

15. A digital processing system comprising:
a processor;
a random access memory (RAM);
a machine readable medium to store one or more instructions when retrieved into said RAM and executed by said processor causes said digital processing system to perform the actions of:
receiving a sign-off request from said user at a first time instance, wherein said user is signed-on to a plurality of domains at said first time instance such that said user is enabled to access resources in each of said plurality of domains prior to said first time instance, wherein said user is signed-on to said plurality of domains by virtue of a single sign on (SSO), wherein said plurality of domains comprises at least three domains; and
signing-off said user out of at least two, but not all, of said plurality of domains in due course by a second time instance upon completion of processing of said sign-off request,
wherein said user is permitted to access resources of domains not signed off after said second time instance.

16. The digital processing system of claim 15, wherein said plurality of domains are organized as a plurality of groups, with each group containing a corresponding set of domains, wherein each of said plurality of groups specifies a master domain and an associated list of domains, wherein said sign-off request specifies a first domain to sign-off from, further performing the actions of:
identifying a first group of said plurality of groups, corresponding to said first domain, wherein said identifying identifies said first group as corresponding to said first domain if the master domain of said first group matches said first domain,
wherein said signing-off signs-off said user from each of the corresponding set of domains in said first group including said first domain,
wherein said signing-off does not sign-off of the corresponding set of domains in a second group of said plurality of groups,
wherein said user is permitted continued access to resources of the corresponding set of domains in said second group after said second time instance.

17. The digital processing system of claim 15, further performing the actions of:
enabling a user to select a second set of domains of said plurality of domains, to sign-off from,
wherein said sign-off request indicates said second set of domains,
wherein said signing-off signs-off said user from each of said second set of domains.

* * * * *

UNITED STATES PATENT AND TRADEMARK OFFICE
CERTIFICATE OF CORRECTION

PATENT NO. : 8,898,765 B2
APPLICATION NO. : 13/396616
DATED : November 25, 2014
INVENTOR(S) : Goyal et al.

Page 1 of 1

It is certified that error appears in the above-identified patent and that said Letters Patent is hereby corrected as shown below:

Title page, column 2, under Other Publications, line 4, delete "sign on" and insert -- sign-on --, therefor.

In the Specification:

In column 1, line 42, delete "sign off" and insert -- sign-off --, therefor.

In the Claims:

In column 13, line 12, in Claim 1, delete "sign on" and insert -- sign-on --, therefor.

In column 14, line 24, in Claim 8, delete "sign on" and insert -- sign-on --, therefor.

In column 15, line 27, in Claim 15, delete "sign on" and insert -- sign-on --, therefor.

Signed and Sealed this
Fourth Day of August, 2015

Michelle K. Lee
*Director of the United States Patent and Trademark Office*